United States Patent Office.

CHARLES W. HEATON, OF LESSNESS HEATH, COUNTY OF KENT, AND THOMAS BOLAS, OF CHISWICK, COUNTY OF MIDDLESEX, ENGLAND, ASSIGNORS TO IHLEE & HORNE, OF LONDON, ENGLAND.

PRODUCTION OF VITRIFIED COVERINGS ON EARTHENWARE, GLASS, &c.

SPECIFICATION forming part of Letters Patent No. 254,312, dated February 28, 1882.

Application filed December 22, 1881. (No specimens.) Patented in England October 31, 1881.

*To all whom it may concern:*

Be it known that we, CHARLES WILLIAM HEATON and THOMAS BOLAS, subjects of the Queen of Great Britain and Ireland, residing respectively at Lessness Heath, in the county of Kent, and at Chiswick, in the county of Middlesex, both in the Kingdom of Great Britain and Ireland, have invented new and useful Improvements in the Production of Enamel or Vitrified Coverings on Earthenware, Glass, Metals, Stone, and other Substances, (for which we have obtained Provisional Protection in Great Britain No. 4,762, bearing date October 31, 1881;) and we do hereby declare that the following is a full, clear, and exact description of the invention, which will enable others skilled in the art to which it appertains to make and use the same.

According to our invention we mix with one or more of the materials ordinarily used, or which may be used, in the production of vitrified enamels, a phosphorescent substance or substances, such as will, after exposure to light, remain luminous for some hours, and we put some of this mixture on the object to be enameled, after which we expose the said object to a heat sufficient in degree to melt, or partially melt, the mixture.

The phosphorescent substance employed may be luminous powder, such as is used in the manufacture of luminous paint, according to the invention for which British Letters Patent No. 4,152, dated November 7, 1877, were granted to the late W. H. Balmain, or such as can be purchased from W. Puzey, of 5 Aldermanbury Postern, in the city of London, or from his agents; but we do not confine ourselves to these particular phosphorescent substances, but use any suitable phosphorescent substance, restricting ourselves, however, to those whose luminosity is of a useful duration—that is, such as are available for the purposes of practical illumination for several hours after exposure to light.

By "one or more of the materials ordinarily used, or which may be used, in the production of vitrified enamels," we mean any of the ordinary fusible materials or fluxes used singly, or admixed by potters and enamelers for the production of glazes or enamels; but all mixtures containing lead, antimony, iron, tin, and other substances which form dark-colored compounds with sulphur must be avoided, unless such metals or other substances are only present in a very small proportion.

We prefer to use a mixture of the phosphorescent powder sold by W. Puzey, with two-thirds of its weight of pure and finely-powdered fluoride of calcium, and about one-fifth of its weight of borate of calcium; but we do not restrict ourselves to these proportions or to these substances.

The above materials we mix in the form of powder, which powder is either laid or spread on the article to be ornamented, after which the heat necessary for fusion is applied; or it may be mingled with water, so as to form a kind of cream, into which the articles may be dipped or with which they may be painted. When dry they are fired, as in the previous case.

What we claim is—

1. In the manufacture of enamel or vitrified covering for earthenware or other substances, the combination therewith of phosphorescent powder of the kind above referred to, so as to make said enamel available for the purposes of practical illumination for several hours after exposure to light, substantially as described.

2. The process of manufacturing or producing luminous enamel or vitrified covering on earthenware and other substances, which consists in combining with the other ingredients constituting said enamels, as above set forth, phosphorescent powder having the property of remaining luminous for several hours after exposure to light, and afterward subjecting the mixture to heat of such intensity as to melt, or partially melt, the said mixture, substantially as described.

3. As a new article of manufacture, enamel rendered luminous by addition of phosphorescent powder of the kind above specified, substantially as described.

CHARLES WILLIAM HEATON.
THOMAS BOLAS.

Witnesses:
W. LLOYD WISE,
  *Patent Agent, London.*
J. J. BROUGHAM,
  *7 Whitehall Place, S. W.*